United States Patent [19]

Frawley

[11] Patent Number: 4,767,686

[45] Date of Patent: Aug. 30, 1988

[54] BATTERY CABLE TERMINATION

[75] Inventor: Lanny J. Frawley, St. Charles, Ill.

[73] Assignee: Cooper Industries, Inc., Houston, Tex.

[21] Appl. No.: 97,355

[22] Filed: Sep. 8, 1987

Related U.S. Application Data

[63] Continuation of Ser. No. 888,820, Jul. 22, 1986, abandoned.

[51] Int. Cl.[4] .................... H01M 2/30; H01R 11/26

[52] U.S. Cl. .................... 429/122; 429/178; 439/759

[58] Field of Search .................... 429/121, 122, 178; 339/228, 224, 227, 229

[56] References Cited

U.S. PATENT DOCUMENTS

| | | | |
|---|---|---|---|
| 1,873,931 | 8/1932 | Matsen | 339/228 |
| 1,995,182 | 3/1935 | Kimball | 173/259 |
| 2,235,935 | 3/1941 | Lee | 339/228 |
| 2,602,105 | 7/1952 | Welch et al. | 339/228 |
| 2,697,819 | 12/1954 | Sundling | 339/227 |
| 3,303,056 | 2/1967 | Sabatino et al. | 136/135 |
| 3,538,490 | 11/1970 | Juggins | 339/228 |
| 3,745,516 | 7/1973 | Lieberman | 339/228 |
| 3,928,079 | 12/1975 | Jennings et al. | 136/135 |
| 4,042,795 | 8/1977 | Sykora | 200/16 D |
| 4,288,504 | 9/1981 | Julian et al. | 429/179 |
| 4,435,486 | 3/1984 | Pomaro et al. | 429/1 |
| 4,483,910 | 11/1984 | Julian | 429/179 |

FOREIGN PATENT DOCUMENTS

| | | | |
|---|---|---|---|
| 504408 | 7/1954 | Canada | 339/228 |
| 421724 | 12/1934 | United Kingdom | 429/121 |

*Primary Examiner*—Anthony Skapars
*Attorney, Agent, or Firm*—Fitch, Even, Tabin & Flannery

[57] ABSTRACT

A battery cable terminal for connecting a cable to a post of a battery. The terminal includes a metallic contact element having a ferrule for receiving an end of the cable and further has a contact portion for engaging the post. The terminal also includes a resilient, one-piece plastic clamp having a pair of arms defining an opening of receiving the post. The clamp holds the element so that the contact portion engages the post when the post is received by the clamp. The arms having facing distal ends defining a constricted throat for the opening with the facing end of each arm having a bearing surface so that the facing ends can be pried apart to increase the size of the opening. The clamp is spreadable from an as-formed condition in which the opening with the clamp holding the element has a dimension less than a corresponding dimension of the post, to a spread condition wherein the dimension of the opening is greater than the corresponding dimension of the post. In the spread condition, the clamp can be inserted over the post without substantial interference. The clamp returns towards its as-formed condition to firmly hold the post upon release of the clamp from its spread condition.

3 Claims, 1 Drawing Sheet

BATTERY CABLE TERMINATION

This application is a continuation of application Ser. No. 888,820 filed July 22, 1986, now abandoned.

The subject invention relates to electrical terminations and, more specifically, to a cable termination for a vehicle battery and which does not require a fastener.

BACKGROUND OF THE INVENTION

Electrical cables connected to the electrical system of a vehicle are typically joined to the battery posts using yoke-shaped terminals, the free ends of which are drawn together using a fastener such as a nut and bolt. While initial tightening of the fastener results in a snug, low resistance termination, with time the material of the post undergoes a change of shape due to cold flow or creep. The terminal is unable to maintain compression and the post moves out of substantially full surface contact with the terminal. This results in a high resistance contact and, due to the high amperage drawn during engine starting, the terminal can become hot and, in an extreme situation, partially melt. A loose fitting terminal also undergoes increased oxidation.

Sealed battery terminations are known in which a plastic cover is molded over a terminal plate. The battery has a lug with an internal thread and a cap nut must be threaded into the lug to hold the plate. The cap nut is unable to maintain compression in the event of cold flow of the lug material. For further information regarding the structure and operation of this prior art termination, reference may be made to U.S. Pat. Nos. 3,928,974; 4,288,504 and 4,483,910.

It is also known to provide a multi-piece termination in which metallic components for engaging the post are pivotally connected to a yoke of spring material. A screwdriver is used to bear against the post to spread the yoke so that the terminal can be pulled over the post. For further information regarding the structure and operation of this battery terminal clamp, reference may be made to U.S. Pat. No. 1,995,182.

SUMMARY OF THE INVENTION

Among the several aspects and features of the subject invention may be noted the provision of an improved battery cable terminal. The terminal is of one-piece construction in that a plastic clamp is molded about a metallic terminal element. The terminal of the present invention avoids the use of a separate fastener and functions to maintain compression on the post even in the event of cold flow of the post material. The terminal can be quickly mounted on and dismounted from the post without damage to the post because the post is not engaged by the tool used to spread the clamp. The terminal of the present invention is reliable in use, has long service life and is relatively easy and economical to manufacture. Other aspects and features of the present invention will be, in part, apparent and, in part, pointed out specifically in the following specification and in the accompanying drawings.

Briefly, the battery cable terminal of the present invention includes a metallic contact element and a resilient, one-piece plastic split clamp having a collar holding the element. The element includes a ferrule for receiving one end of the cable and further has a contact portion for engaging the battery post. The clamp has a pair of arms at least partially defining an opening for receiving the post. The clamp holds the element so that the contact portion engages the post when the post is received by the clamp. The arms have facing distal ends defining a constricted throat for the opening with the facing end of each arm having a bearing surface so that the facing ends can be pried apart to increase the size of the opening. In the spread condition of the clamp, the clamp can be inserted over the post without substantial interference. Upon release of the clamp from its spread condition, the clamp returns towards its as-formed condition to firmly hold the post.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
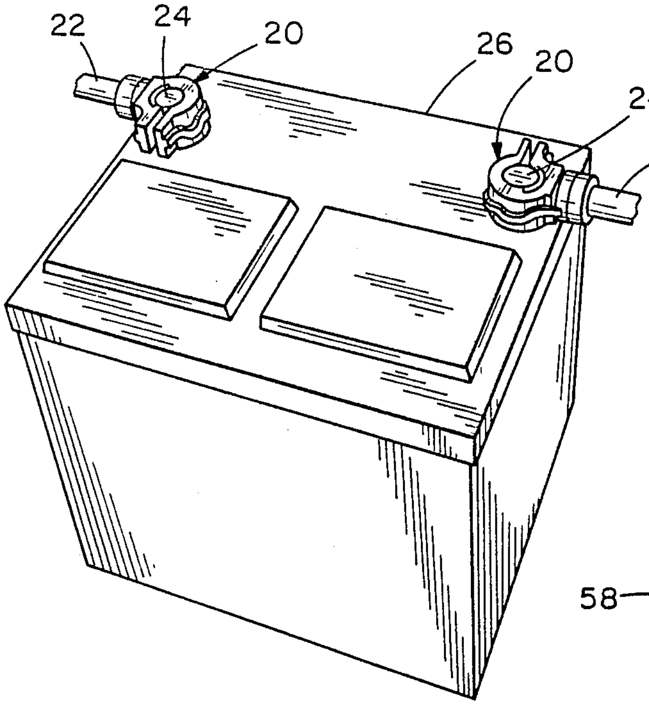
FIG. 1 is a perspective view of a vehicle battery showing cables connected to the battery posts by battery cable terminals embodying various features of the present invention.

Referring now to the drawings, battery cable terminals for mechanically and electrically connecting electrical cables 22 to the generally cylindrical posts 24 of a vehicle battery 26 (shown in FIG. 1), are generally indicated by reference numeral 20. Each terminal 20 includes a metallic contact element 28 and a resilient plastic clamp 30 having a collar 32 which is molded about a part of the element 28 so that the terminal is a single piece. The clamp is in the form of a split ring made up of two arms 35, 36 defining an opening 37. The arms can be pried apart to spread the clamp to receive a post 24. It is common for the positive post to have a slightly larger diameter than the negative post. As the clamp is spreadable and resilient, a single size of the terminal 20 can be used for both the positive and negative posts.

Figure 2:
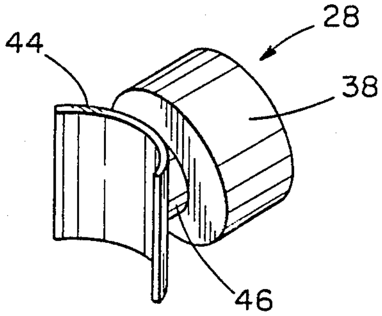
FIG. 2 is a perspective view of a metallic contact element of the terminal of FIG. 1.
Figure 3:
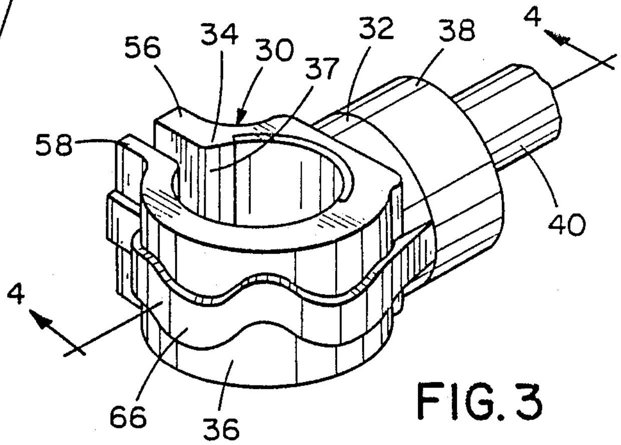
FIG. 3 is a perspective view of the terminal of FIG. 1 showing a plastic clamp having a collar molded about the contact element.
Figure 4:
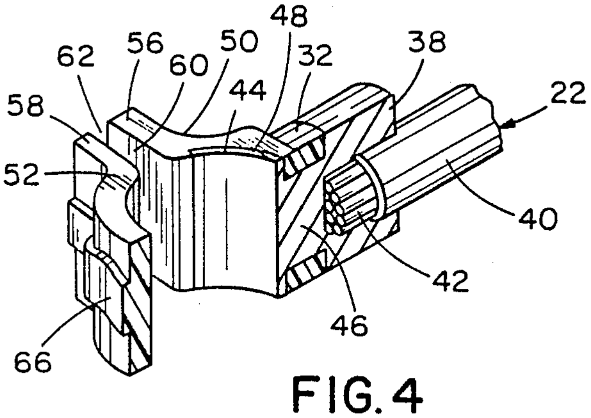
FIG. 4 is a sectional view taken generally along line 4—4 of FIG. 3.
Figure 5:
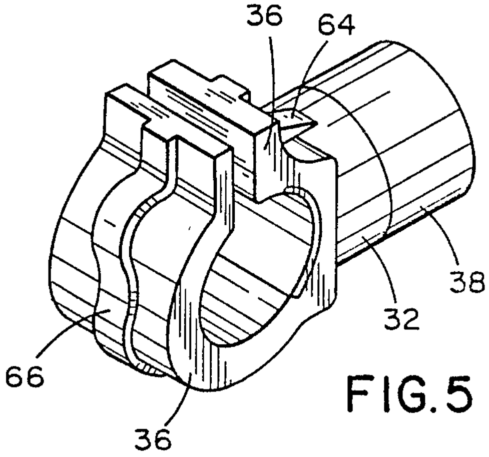
FIG. 5, similar to FIG. 3, is a perspective view of the terminal rotated 90 degrees from its position shown in FIG. 3.

The element 28, best shown in FIGS. 2 and 3, includes a ferrule 38 for receiving an end 40 of the cable 22 from which the insulation has been stripped to expose the conductors 42. The element also includes a contact portion 44 connected to the ferrule by a neck 46 of reduced diameter. The contact portion is preferably in the form of an arcuate plate and has a shape similar to the outside surface of a post 24 to enter into generally full surface contact with the post thereby establishing a low resistance electrical connection. The element 28 can be formed of lead and can be die cast over the stripped cable end 40. Alternatively, the element 28 can be formed from a metallic blank made of a material such as brass or stainless steel which is stamped, folded and rolled to define the various components of the element. The ferrule formed from the blank can be crimped by rolling about the cable end 40 or a tube lug may be provided in the ferrule and a round crimp employed.

The clamp 30 and collar 32 are molded of a suitable thermoplastic or thermosetting plastic with the collar 32 being molded about the neck 46 of the element. The contact portion 44 is disposed preferably in a recess 48 formed by the inside surface of the clamp. The arms 34, 36 forming the split ring of the clamp have distal ends 50, 52, respectively, which can be pried apart to increase the diameter of the opening 37 in the clamp.

Figure 6:
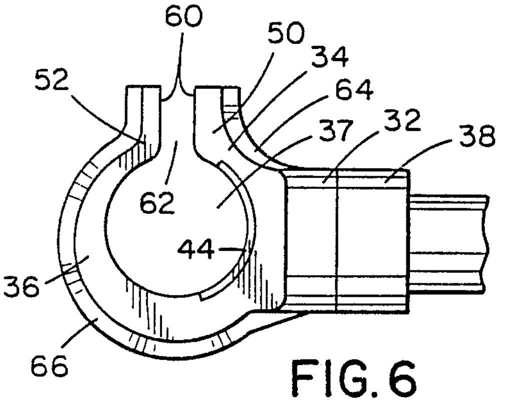
FIG. 6 is a plan view of the terminal of the present invention showing the clamp in its as-formed condition.
Figure 7:
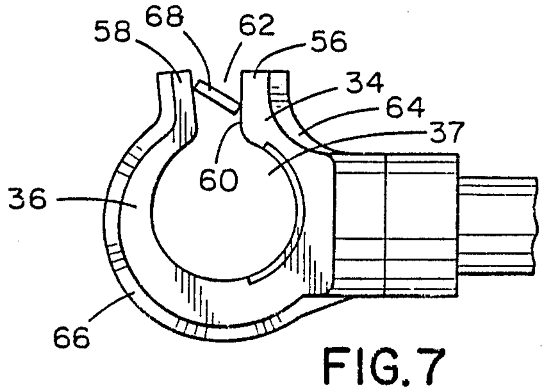
FIG. 7, similar to FIG. 6, illustrates a simple hand tool, such as a screwdriver being used to spread the clamp to receive the post.

More specifically, each distal end has a lip 56, 58, respectively, having a facing bearing surface 60. The lips extend generally in spaced parallel relationship outwardly from the opening 37 and define a constricted throat 62 for the opening 37. FIG. 6 shows the clamp in its as-formed condition wherein the diameter of the opening 37, defined by the arms 34, 36 and the contact portion 44, is less than the outside diameter of either battery post 24. By inserting a simple hand tool, such as a screwdriver, between the lips 56, 58, the tool can be used to spread the arms 34, 36 sufficiently to increase the size of the opening 37 to receive the post without interference from the post as shown in FIG. 7. The arms and collar are preferably molded from an engineering thermoplastic resin such as Torlon, a registered trademark of Amoco Chemicals, Celanex, a registered trademark of the Celenese Corporation, or Ultem, a registered trademark of General Electric. A fiber reinforced polymeric compound can also be used for the arms and collar.

The arm 34 is shorter than arm 36 and is relatively rigid with a fillet 64 interconnecting the collar and the arm 34. Thus, the axis of the constricted throat extends transversely to the axis of the collar 32 and preferably is at a right angle thereto. The longer arm 36 preferably has a decreasing thickness from its connected end (at the collar 32) to its distal end 52. This allows increasing flexibility away from its connected end so that the application of spreading forces causes the longer arm 36 effectively to "unwind" to permit reception of the post 24. Upon release of the arms 34, 36, forces are applied to the captured post 24 by the arm 36 pushing the post against the surface of the contact portion 44 of the element 28 resulting in a low resistance, substantially full surface engagement. This engagement is maintained by the application of compressive force by the arms even with cold flow or creep of the post material.

Preferably, a strengthening rib 66 is provided on the outside surface of the arm 36. The rib is substantially centrally located and preferably is undulating. The rib provides increased stiffness without a generally thickening of the arm 36. When the arms are spread, the outside surface of the rib 36 goes into compression. The use of the undulating rib offers advantages over a straight rib because with the undulating rib, there is sideways deflection of the rib. This results in an increase in the elastic limit of the undulating rib 36 compared to a straight rib to provide increased strength of the clamp 30 without exceeding its elastic limit.

Operation of the battery cable terminal 20 of the present invention is as follows: Referring to FIG. 6, the clamp is shown in its as-formed condition wherein a dimension of the opening 37 is smaller than a corresponding dimension of the post 24 to be received. In the case of a cylindrical post and a generally circular opening, the diameter of the opening is smaller than the outside diameter of the post. Referring to FIG. 7, the blade 68 of a screwdriver can be inserted between the lips 56 and 58 and by using the screwdriver as a lever contacting the bearing surfaces 60, the arms 34, 36 of the clamp 30 can be spread causing the size of the opening 37 to increase sufficiently that the clamp can be placed over the post without substantial interference from the post. Upon release of the arms 34, 36, due to their resiliency, the clamp 30 firmly holds the post 24 against the contact portion 44 of the metallic terminal element 28.

Unlike conventional battery cable terminals employing threaded fasteners, the battery cable terminal 20 of the present invention applies compressive forces to the post even after the post has undergone a slight change of shape due to cold flow of the material of the post. This results in a long service life, low resistance, reliable connection. Additionally, the clamp can easily be spread by reversing the above-described mounting procedure to achieve fast and simple dismounting of the terminal. This is very convenient when the battery 26 requires replacement.

It will be appreciated that the collar 32 and the ferrule 38 have substantially the same dimensions so that the ferrule metallic material is exposed. Alternatively, the ferrule 38 could have larger or smaller dimensions as long as not insulated by a plastic covering. This provides a convenient location for connection of a jumper cable should jump starting of the battery be needed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A battery cable terminal for mechanically and electrically connecting an electrical cable to a post of a battery, said terminal comprising:

a metallic contact element including a ferrule for receiving an end of said cable from which insulation has been removed, and a contact portion for engaging said post; and a resilient, one-piece plastic clamp means having a pair of arms at least partially defining an opening for receiving said post, said clamp means holding said element so that said contact portion engages said post when said post is received by said arms, said arms having facing distal ends defining a constricted throat for said opening with the facing end of each arm having a bearing surface so that the facing ends can be pried apart to increase the size of said opening, said arms being spreadable relative to each other from an as-formed condition wherein said opening with said clamp means holding said element has a dimension less than a corresponding dimension of said post, to a spread condition wherein said dimension of said opening is greater than the corresponding dimension of said post so that said arms can be inserted over said post without substantial interference from said post, said arms returning toward their as-formed condition to firmly hold said post upon release of said arms from their spread condition, said arms forming a split ring, said clamp means further comprising a collar molded about a component of said metallic contact element, said collar being connected to and extending outwardly from said ring, said arms having connected ends and said arms extending from said collar, one of said arms being longer than the other arm so that the axis of said throat is transverse to the axis of said collar, said one arm progressively decreasing in thickness from its connected end to its distal end so that the flexibility of said one arm increases as a function of distance from its connected end.

2. A battery cable terminal for mechanically and electrically connecting an electrical cable to a post of a battery, said terminal comprising:

a metallic contact element including a ferrule for receiving an end of said cable from which insulation has been removed, and a contact portion for engaging said post; and a resilient, one-piece plastic clamp means having a pair of arms at least partially defining an opening for receiving said post, said clamp means holding an element so that said contact portion engages said post when said post is received by said arms, said arms having facing distal ends defining a constricted throat for said opening with the facing end of each arm having a bearing surface so that the facing ends can be pried apart to increase the size of said opening, said arms being spreadable relative to each other from an as-formed condition wherein said opening with said clamp means holding said element has a dimension less than a corresponding dimension of said post, to a spread condition wherein said dimension of said opening is greater than the corresponding dimension of said post so that said arms can be inserted over said post without substantial interference from said post, said arms returning toward their as-formed condition to firmly hold said post upon release of said arms from their spread condition, said arms forming a split ring, said clamp means further comprising a collar molded about a component of said metallic contact element, said collar being connected to and extending outwardly from said ring, said arms having connected ends and said arms extending from said collar, one of said arms being longer than the other arm so that the axis of said throat is transverse to the axis of said collar, said one arm having a substantially centrally located strengthening rib on its outside surface, said strengthening rib undulating in the axial direction of said opening so that it has a greater length than the length of the portion of said one arm to which said rib is attached.

3. A battery cable terminal as set forth in claim 2 wherein said undulating rib has substantially uniform thickness and substantially uniform width.

* * * * *